United States Patent
Ketola et al.

(10) Patent No.: US 11,370,666 B2
(45) Date of Patent: Jun. 28, 2022

(54) METHOD OF PREPARING PENTACHLORODISILANE PURIFIED REACTION PRODUCT COMPRISING SAME

(71) Applicant: Jiangsu Nata Opto-Electronic Materials Co. Ltd., Jiangsu (CN)

(72) Inventors: Barry Ketola, Wilmington, DE (US); Noel Mower Chang, Wilmington, DE (US); Jeanette Young, Wilmington, DE (US); Xiaobing Zhou, Wilmington, DE (US)

(73) Assignee: Jiangsu Nata Opto-Electronic Materials Co. Ltd., Jiangsu Province (CN)

( * ) Notice: Subject to any disclaimer, the term of this patent is extended or adjusted under 35 U.S.C. 154(b) by 58 days.

(21) Appl. No.: 16/635,442

(22) PCT Filed: Jul. 30, 2018

(86) PCT No.: PCT/US2018/044390
§ 371 (c)(1),
(2) Date: Jan. 30, 2020

(87) PCT Pub. No.: WO2019/027906
PCT Pub. Date: Feb. 7, 2019

(65) Prior Publication Data
US 2020/0369527 A1    Nov. 26, 2020

Related U.S. Application Data

(60) Provisional application No. 62/538,858, filed on Jul. 31, 2017.

(51) Int. Cl.
*C01B 33/107*    (2006.01)
*B01D 3/14*    (2006.01)

(52) U.S. Cl.
CPC .......... *C01B 33/10778* (2013.01); *B01D 3/14* (2013.01)

(58) Field of Classification Search
None
See application file for complete search history.

(56) References Cited

U.S. PATENT DOCUMENTS

2002/0187096 A1    12/2002   Kendig et al.
2013/0294995 A1*   11/2013   Mueh ................ C01B 33/10773
                                                           423/342
2015/0080596 A1*   3/2015    Nguyen ................. C07F 7/121
                                                           556/487
2016/0111272 A1*   4/2016    Girard ............... H01L 21/02532
                                                           438/758
2017/0283267 A1    10/2017   Yashima et al.

FOREIGN PATENT DOCUMENTS

| DE | 102014007766 A1 | 11/2015 |
| EP | 0301678 A2 | 2/1989 |
| WO | 2013123213 A1 | 8/2013 |
| WO | 2016047736 A1 | 3/2016 |
| WO | 2016091240 A1 | 6/2016 |
| WO | 2016191194 A1 | 12/2016 |

OTHER PUBLICATIONS

International Search Report for PCT/US2018/044390 dated Oct. 29, 2018, 5 pages.
Machine assisted English translation of DE102014007766A1 obtained from https://patents.google.com/patent on Apr. 30, 2020, 9 pages.
Machine assisted English translation of WO2016091240A1 obtained from https://patents.google.com/patent on Apr. 30, 2020, 12 pages.
Schwarz, Robert; Pietsch, Georg, "Preparation of Silicon Dichloride", Zeitschrift fuer Anorganische und Allgemeine Chemie (1937), 232, 249-56.
Feher, Franz; Plichta, Peter; Guillery, Rolf, "Chemistry of silicon and germanium. XII. Transformation of disilane, trisilane, and n-tetrasilane with elementary bromine and chlorine in Freon", Inorganic Chemistry (1971), 10(3), 606-8.
Raml, Walter; Hengge, Edwin, "Amine Catalyzed Decomposition of Oligochlorosilanes with Hydrogen Chloride", Monatshefte fuer Chemie (1980), 111(1), 29-36.
Cerny, Mirko; Joklik, Jaroslav; Trka, Antonin; Dolejs, Ladislav, "Composition of High-Boiling Fractions from the Direct Synthesis of Trichlorosilanes", Chemicky Prumysl (1975), 25(4), 191-3.

* cited by examiner

*Primary Examiner* — Sudhakar Katakam
*Assistant Examiner* — Jennifer C Sawyer
(74) *Attorney, Agent, or Firm* — Morgan, Lewis & Bockius LLP

(57) ABSTRACT

A method of preparing pentachlorodisilane is disclosed. The method comprises partially reducing hexachlorodisilane with a metal hydride compound to give a reaction product comprising pentachlorodisilane. The method further comprises purifying the reaction product to give a purified reaction product comprising the pentachlorodisilane. The purified reaction product comprising pentachlorodisilane formed in accordance with the method is also disclosed.

7 Claims, No Drawings

METHOD OF PREPARING PENTACHLORODISILANE PURIFIED REACTION PRODUCT COMPRISING SAME

CROSS-REFERENCE TO RELATED APPLICATIONS

This application is the national stage of International Appl. No. PCT/US2018/044390 filed on 30 Jul. 2018, which claims priority to and all advantages of U.S. Patent Application No. 62/538,858 filed on 31 Jul. 2017, the contents of which are incorporated herein by reference.

FIELD OF THE INVENTION

The present invention generally relates to a method of preparing pentachlorodisilane and, more specifically, to a method of preparing a purified reaction product comprising pentachlorodisilane with excellent yield and conversion and to the purified reaction produced formed thereby.

DESCRIPTION OF THE RELATED ART

Silane compounds are known in the art and utilized in diverse end use applications. For example, silane compounds may be utilized to prepare organopolysiloxanes, e.g. silicone polymers or resins. Alternatively, silane compounds are ubiquitously utilized in the electronics industry. For example, silane compounds are utilized to form thin films via deposition (e.g. chemical vapor deposition, atomic layer deposition, etc.). The thin films may comprise crystalline silicon, or silica ($SiO_2$), depending on a selection of the silane compound utilized. Typically, such silane compounds include silicon-bonded hydrogen atoms (silicon hydride) and/or silicon-bonded halogen atoms.

One such example of a silane compound is pentachlorodisilane. However, pentachlorodisilane is difficult to synthesize and expensive to otherwise obtain. For example, one technique for synthesizing pentachlorodisilane involves oligomerizing a monosilane (e.g. $SiCl_4$) in the presence of hydrogen ($H_2$). Another technique involves cleaving silicon-silicon bonds in higher order silane compounds (e.g. tri- or higher order silane compounds). However, such techniques require significant energy and/or expensive starting reagents.

SUMMARY OF THE INVENTION

The present invention provides a method of preparing pentachlorodisilane. The method comprises partially reducing hexachlorodisilane with a metal hydride compound to give a reaction product comprising pentachlorodisilane. The method further comprises purifying the reaction product to give a purified reaction product comprising the pentachlorodisilane.

The purified reaction product comprising pentachlorodisilane formed in accordance with the method is also provided.

DETAILED DESCRIPTION OF THE INVENTION

A method of preparing pentachlorodisilane is disclosed. The pentachlorodisilane is prepared in a purified reaction product and may be utilized in diverse end use applications. For example, the pentachlorodisilane may be utilized as a starting component when preparing organopolysiloxanes, e.g. via cohydrolysis and co-condensation. Alternatively or in addition, the pentachlorodisilane may be utilized for deposition, e.g. of a silicon (including polysilicon or monosilicon) or silica film.

The method comprises partially reducing hexachlorodisilane with a metal hydride compound to give a reaction product comprising pentachlorodisilane. Partially reducing hexachlorodisilane with the metal hydride compound generally comprises combining the hexachlorodisilane and the metal hydride compound. Combining the hexachlorodisilane and the metal hydride compound may also be referred to as contacting the hexachlorodisilane and the metal hydride compound. Said differently, there is no proactive step required for partial reduction beyond combining the hexachlorodisilane and the metal hydride compound.

By "partially reducing," it is meant that hexachlorodisilane is partially reduced by the metal hydride compound to give pentachlorodisilane, as compared to fully reducing hexachlorodisilane to disilane. More specifically, partial reduction refers to but one of the six silicon-bonded chlorine atoms being replaced by or otherwise substituted with a silicon-bonded hydrogen atom, thereby reducing the parent disilane (i.e., hexachlorodisilane) once to give the pentachlorodisilane. Partial reduction in the inventive method is limited to but one of the six silicon-bonded chlorine atoms to give the pentachlorodisilane. Any of the six silicon-bonded chlorine atoms may be replaced with silicon-bonded hydrogen via the inventive method; for example, the pentachlorodisilane may be represented by $HCl_2Si*SiCl_3$ and/or $Cl_3Si*SiCl_2H$. As described below, partial reduction of the hexachlorodisilane may result in byproducts in the reaction product other than pentachlorodisilane. For example, the reaction product may also include tetrachlorodisilanes, trichlorodisilanes, etc. As is also described below, the reaction product is purified in the inventive method so as to minimize and/or eliminate such byproducts from the reaction product, thereby giving the purified reaction product comprising the pentachlorodisilane.

The invention has technical and non-technical advantages. One of the problems solved by the processes is providing, relative to conventional processes, improved processes of making the pentachlorodisilane. For example, the inventive method typically prepares pentachlorodisilane in higher purity, higher yield, greater selectivity, or a combination of any two or more thereof, than conventional processes. Moreover, the inventive method can be scaled up for high volume production of pentachlorodisilane at low cost, particularly as compared to conventional processes.

As understood in the art, hexachlorodisilane has the formula $Cl_3SiSiCl_3$. Hexachlorodisilane may be synthesized, prepared, or otherwise obtained. For example, hexachlorodisilane may be synthesized via chlorination of calcium silicide ($CaSi_2$). Hexachlorodisilane is also commercially available from numerous suppliers.

The metal hydride compound may comprise any metal hydride compound capable of partially reducing the hexachlorodisilane to give pentachlorodisilane. Metal hydride compounds suitable for the purposes of the present invention include, but are not limited to, hydrides of sodium, magnesium, potassium, lithium, boron, calcium, titanium, zirconium, and aluminum, metal hydride compounds including at least one of these same metals, and any combinations thereof. The metal hydride compound can be a simple (binary) metal hydride compound or a complex metal hydride compound. The metal hydride compound may also include elements, atoms, or substituents other than metal and hydrogen. For example, the metal hydride compound may include substituted or unsubstituted hydrocarbyl groups, heteroelements, etc.

In certain embodiments, the metal hydride compound is selected from diisobutylaluminum hydride (DIBAH), dimethylaluminum hydride, diethylaluminum hydride, di(n-propyl)aluminum hydride, diisopropylaluminum hydride, di(n-butyl)aluminum hydride, di(sec-butyl)aluminum hydride, di(tert-butyl)aluminum hydride, di(n-pentyl)aluminum hydride, di(iso-pentyl)aluminum hydride, di(sec-pentyl)aluminum hydride, di(3-pentyl)aluminum hydride, di(tert-pentyl)aluminum hydride, di(neo-pentyl)aluminum hydride, isomers of dihexylaluminum hydrides, isomers of diheptylaluminum hydrides, isomers of dioctylaluminum hydrides, isomers of dinonylaluminum hydrides, isomers of didecylalumminum hydrides, alkylaluminum dihydrides, sodium bis(2-methoxyethoxy)aluminumhydride (e.g. Vitride, Red-Al, etc.), aluminum hydride, lithium hydride, sodium hydride, sodium borohydride, lithium aluminum hydrides (including, for example, $LiAl(OtBu)_3H$ or $LiAl(iBu)_2(OtBu)H$, where tBu is tert-butyl and iBu is isobutyl), sodium aluminum hydride, lithium borohydride, magnesium hydride, magnesium borohydride, calcium hydride, titanium hydride, zirconium hydride, tetramethylammonium borohydride, potassium borohydride, etc. Combinations of different metal hydride compounds or combinations of metal hydride compounds with trialkylaluminum compounds may be utilized in concert. Any alkyl groups may be independently selected from, for example, methyl, ethyl and isomeric propyl, butyl, pentyl, hexyl, heptyl, octyl, nonyl and/or decyl, In specific embodiments, the metal hydride compound comprises, alternatively consists essentially of, alternatively consists of, diisobutylaluminum hydride (DIBAH).

It certain embodiments, the metal hydride compound is disposed in a carrier vehicle, such as a solvent or dispersant. The carrier vehicle, if present, may comprise an organic solvent. The organic solvent can be an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride; chloroform; dimethyl sulfoxide; dimethyl formamide, acetonitrile; tetrahydrofuran; white spirits; mineral spirits; naphtha; n-methyl pyrrolidone; or a combination thereof.

When disposed in the carrier vehicle, the metal hydride compound is typically present in the carrier vehicle in an amount to provide from 1 to 99, alternatively from 10 to 80, alternatively from 40 to 60, weight percent based on the combined weight of the metal hydride compound and the carrier vehicle.

Methods of preparing metal hydride compounds are well known in the art and many of these compounds are commercially available from various suppliers.

The relative amount of the metal hydride compound utilized may vary dependent upon the particular metal hydride compound selected, the reduction parameters employed, etc. The molar ratio of the metal hydride compound to the hexachlorodisilane utilized in the partial reduction influences rates and/or amounts of conversion to, and/or selectivity for, the pentachlorodisilane (i.e., as compared to byproducts). Thus, the relative amounts of the metal hydride compound and hexachlorodisilane, as well as the molar ratio thereof, may vary. Typically, these relative amounts and the molar ratio are selected to maximize a conversion rate and/or a selectivity of partial reduction of the hexachlorodisilane to pentachlorodisilane. For example, using a significant molar excess of the metal hydride compound to the hexachlorodisilane may result in an over reduction of the hexachlorodisilane to byproducts other than pentachlorodisilane (e.g. tetrachlorodisilanes, trichlorodisilanes, dichlorodisilanes, etc.), formation of other byproducts, and/or decomposition of the hexachlorodisilane, pentachlorodisilane, etc.

In certain embodiments, the molar ratio of the hexachlorodisilane to the metal hydride compound is from 1:0.01 to 1:3, alternatively from 1:0.05 to 1:1.25, alternatively from 1:0.1 to 1:1.2, alternatively from 1:0.2 to 1:1.1, alternatively from 1:0.3 to 1:1, alternatively from 1:0.4 to 1:0.9, alternatively from 1:0.5 to 1:0.8.

Typically, partial reduction of the hexachlorodisilane to prepare the reaction product comprising pentachlorodisilane is carried out in a vessel or reactor. The hexachlorodisilane and the metal hydride compound may be fed together or separately to the vessel, or may be disposed in the vessel in any order of addition. When partial reduction is carried out at an elevated temperature, as described below, the vessel or reactor may be heated in any suitable manner, e.g. via a jacket.

The hexachlorodisilane and the metal hydride compound may be fed to the vessel sequentially over time or at once.

Parameters may be modified during partial reduction of the hexachlorodisilane to prepare the reaction product comprising pentachlorodisilane. For example, temperature, pressure, and other parameters may be independently selected or modified during partial reduction of the hexachlorodisilane to prepare the reaction product comprising pentachlorodisilane. Any of these parameters may independently be an ambient parameter (e.g. room temperature and/or atmospheric pressure) and/or a non-ambient parameter (e.g. reduced or elevated temperature and/or reduced or elevated pressure). Any parameter may also be dynamic, modified in real time, i.e., during the inventive method, or may be static.

In certain embodiments, partial reduction of the hexachlorodisilane to prepare the reaction product comprising pentachlorodisilane is carried out at an elevated temperature.

The elevated temperature is typically from greater than ambient temperature (e.g. 22-25° C.) to 150, alternatively from 30 to 140, alternatively from 40 to 130, alternatively from 50 to 120, alternatively from 60 to 110, alternatively from 70 to 100, alternatively from 75 to 95, alternatively from 80 to 90, ° C.

The hexachlorodisilane and/or the metal hydride compound may be independently heated and combined, combined and heated (prior to, during, and/or after such combination), etc. In certain embodiments, the hexachlorodisilane is heated to the elevated temperature, and the metal hydride compound is combined with the hexachlorodisilane at the elevated temperature. The hexachlorodisilane and the metal hydride compound may be combined simultaneously, incrementally, etc. The metal hydride compound may be incrementally combined with the hexachlorodisilane compound over time.

The hexachlorodisilane and the metal hydride compound independently may be stored under an anhydrous condition (i.e., lacking water), under an inert atmosphere, or, typically, both, i.e., an anhydrous inert atmosphere. The inert atmosphere is typically a gas comprising molecular nitrogen, helium, argon, or a mixture of any two or more thereof. Similarly, partial reduction of the hexachlorodisilane to prepare the reaction product comprising pentachlorodisilane may be carried out under an anhydrous condition and/or under an inert atmosphere.

The method may further comprise agitating the hexachlorodisilane and the metal hydride compound. The agitating may enhance mixing and contacting together of the hexachlorodisilane and the metal hydride compound when combined, including in a reaction mixture thereof. Such contacting independently may use other conditions, with (e.g. concurrently or sequentially) or without (i.e., independent from, alternatively in place of) the agitating. The other conditions may be tailored to enhance the contacting, and thus reaction (i.e., partial reduction), of the hexachlorodisilane so as to form the pentachlorodisilane in a particular contacting step. Other conditions may be result-effective conditions for enhancing reaction yield or minimizing amount of a particular reaction by-product included within the reaction product along with the pentachlorodisilane.

The time during which partial reduction of the hexachlorodisilane to prepare the reaction product comprising pentachlorodisilane is carried out is a function of scale, reaction parameters and conditions, selection of the metal hydride compound, etc. In certain embodiments, the time during which partial reduction of the hexachlorodisilane to prepare the reaction product comprising pentachlorodisilane is carried out is from greater than 0 to 24 hours, alternatively from greater than 0 to 12 hours, alternatively from greater than 0 to 6 hours, alternatively from greater than 0 to 2 hours, after combining the hexachlorodisilane and the metal hydride compound.

In certain embodiments, partial reduction of the hexachlorodisilane to prepare the reaction product comprising pentachlorodisilane is carried out in the absence of any carrier vehicle or solvent. For example, no carrier vehicle or solvent may be combined discretely with the hexachlorodisilane and/or the metal hydride compound. In these or other embodiments, neither the hexachlorodisilane nor the metal hydride compound is disposed in any carrier vehicle or solvent such that no carrier vehicle or solvent is present during partial reduction attributable to the hexachlorodisilane and/or the metal hydride compound.

Alternatively, partial reduction may be carried out in the presence of a carrier vehicle or solvent. Specific examples thereof are introduced above with regard to potential carrier vehicles for the metal hydride compound.

As introduced above, the reaction product may include various byproducts from partially reducing the hexachlorodisilane. These may include other reduced forms of hexachlorodisilane, e.g. tetrachlorodisilanes, trichlorodisilanes, dichlorodisilanes, etc., residual and/or unreacted amounts of hexachlorodisilane and/or the metal hydride compound, or degradation products thereof. The reaction product typically also includes a metal chloride formed from the metal hydride compound upon partial reduction of the hexachlorodisilane. The metal chloride present in the reaction product is generally a function of the metal hydride compound utilized. For example, when the metal hydride compound comprises diisobutylaluminum hydride, the metal chloride compound may comprise diisobutylaluminum chloride. If partial reduction of hexachlorodisilane is carried out in any carrier vehicle or solvent, the reaction product typically also includes such carrier vehicle or solvent. However, because the method is typically carried out neat, i.e., in the absence of solvent, this is typically not the case. The metal chloride is typically a liquid in the reaction product.

The method further comprises purifying the reaction product to give a purified reaction product comprising the pentachlorodisilane. Any suitable technique for purification may be utilized. Examples of suitable techniques include distilling, evaporating, extracting, freeze drying, gas chromatography, ion exchange chromatography, reverse phase liquid chromatography, stripping, and/or volatilizing.

In certain embodiments, purifying the reaction product comprises distilling the reaction product to give the purified reaction product. In specific embodiments, distilling the reaction product prepares a crude reaction product comprising the pentachlorodisilane, and the method further comprises purifying the crude reaction product to give the purified reaction product.

For example, the reaction product may be distilled upon formation such that the crude reaction product is condensed and collected. The crude reaction product has a higher content of the pentachlorodisilane than does the reaction product. In certain embodiments, the crude reaction product comprises the pentachlorodisilane in an amount of from 5 to 70, alternatively from 6 to 47, alternatively from 7 to 44, alternatively from 8 to 41, alternatively from 9 to 38, alternatively from 10 to 35, alternatively from 11 to 32, alternatively from 12 to 29, alternatively from 13 to 26, alternatively from 14 to 23, alternatively from 15 to 20, weight percent based on the total weight of the crude reaction product. The concentration of the pentachlorodisilane in the crude reaction product may vary from the ranges set forth herein. The concentration of the pentachlorodisilane in the crude reaction product may be determined via known methods, e.g. gas chromatography, optionally via a gas chromatography-thermal conductivity detector.

Distilling the reaction product to prepare the crude reaction product comprising the pentachlorodisilane is typically carried out at (i) an elevated temperature; (ii) a reduced pressure; or (iii) both an elevated temperature and reduced pressure. By elevated or reduced, it is meant as compared to room temperature and atmospheric pressure. As understood in the art, the number of trays utilized in distillation may be optimized and may influence a concentration or yield of the pentachlorodisilane. For example, use of a greater number of trays via distillation may increase the concentration or yield of the pentachlorodisilane in the crude reaction product.

The elevated temperature is typically from greater than ambient temperature to 150, alternatively from 30 to 140, alternatively from 40 to 130, alternatively from 50 to 120, alternatively from 60 to 110, alternatively from 70 to 100, alternatively from 75 to 95, alternatively from 80 to 90, ° C. The reduced pressure it typically operated as a vacuum, although any reduced pressure between vacuum and atmospheric pressure may be utilized. For example, the reduced pressure may be from greater than 0 to 200, alternatively from greater than 0 to 100, alternatively from greater than 0 to 90, alternatively from greater than 0 to 80, alternatively from greater than 0 to 70, alternatively from greater than 0 to 60, alternatively from greater than 0 to 50, alternatively from greater than 0 to 40, alternatively from greater than 0 to 30, alternatively from greater than 0 to 20, alternatively from 5 to 15, Torr. The elevated temperature may also differ from the ranges set forth above, e.g. in the event the reaction product includes any carrier vehicle or solvent.

The crude reaction product may be condensed and collected at any suitable temperature. In certain embodiments, the crude reaction product is condensed at a temperature of from 0 to 25, alternatively from 0 to 20, alternatively from 0 to 15, alternatively from 0 to 10, alternatively from 4 to 6, ° C.

When the method further comprises purifying the crude reaction product to give the purified reaction product, the crude reaction product may be purified via any suitable technique. The purification technique may be the same as or different from the purification technique utilized to prepare the crude reaction product from the reaction product. In certain embodiments, purifying the crude reaction product to give the purified reaction product comprises distilling the crude reaction product. In specific embodiments, purifying the crude reaction product comprises fractionally distilling the crude reaction product. The description below associated with parameters of purifying the crude reaction product apply whether distillation or fractional distillation is utilized.

Like distilling the reaction product, distilling the crude reaction product is typically carried out at (i) an elevated temperature; (ii) a reduced pressure; or (iii) both an elevated temperature and reduced pressure. By elevated or reduced, it is meant as compared to room temperature and atmospheric pressure. As introduced above and as understood in the art, the number of trays utilized in distillation may be optimized and may influence a concentration or yield of the pentachlorodisilane. For example, use of a greater number of trays via distillation may increase the concentration or yield of the pentachlorodisilane.

The elevated temperature is typically from greater than ambient temperature to 150, alternatively from 30 to 140, alternatively from 40 to 130, alternatively from 50 to 120, alternatively from 60 to 110, alternatively from 70 to 100, alternatively from 75 to 95, alternatively from 80 to 90, ° C. The reduced pressure it typically operated as a vacuum, although any reduced pressure between vacuum and atmospheric pressure may be utilized. For example, the reduced pressure may be from greater than 0 to 200, alternatively from greater than 0 to 100, alternatively from greater than 0 to 90, alternatively from greater than 0 to 80, alternatively from greater than 0 to 70, alternatively from greater than 0 to 60, alternatively from greater than 0 to 50, alternatively from greater than 0 to 40, alternatively from greater than 0 to 30, alternatively from greater than 0 to 20, alternatively from 5 to 15, Torr.

In certain embodiments, distillation of the crude reaction product utilizes more trays or plates than distillation of the reaction product. However, as understood in the art, the number of trays or plates may be modified, and a feed location may also be optimized or modified.

Typically, distillation of the crude reaction product comprises a plurality of purification steps. For example, distillation and/or fractional distillation may be repeated any number of times to further concentrate the pentachlorodisilane in the purified reaction product. The purified reaction product refers to the final form of a composition resulting from any number of purification steps to which the reaction product is subjected.

For example, distillation of the crude reaction product may prepare a first concentrated reaction product. Distillation of the first concentrated reaction product may then prepare a second concentrated reaction product. Distillation of the second concentrated reaction product may then prepare a third concentrated reaction product. Each iteration of the reaction product is distinguished from the prior iteration (i.e., the third concentrated reaction product is distinguished from the second concentrated reaction product, and the second concentrated reaction product is distinguished from the first concentrated reaction product) by virtue of a relative concentration of the pentachlorodisilane in a particular concentrated reaction product, as compared to other components (e.g. byproducts, starting materials, etc.) therein. Specifically, the relative concentration of the pentachlorodisilane (i.e., the purity) increases via each iterative purification step. Each iterative purification step may be independently selected.

Thus, to increase the concentration of the pentachlorodisilane in the purified reaction product, purification of the crude reaction product typically prepares the first concentrated reaction product, and the first concentrated reaction product is then further purified. In certain embodiments, the first concentrated reaction product comprises the pentachlorodisilane in an amount of from 20 to 83, alternatively from 22 to 80, alternatively from 24 to 77, alternatively from 26 to 74, alternatively from 28 to 71, alternatively from 30 to 68, alternatively from 32 to 65, alternatively from 34 to 62, alternatively from 36 to 59, alternatively from 38 to 56, alternatively from 40 to 53, alternatively from 42 to 50, weight percent based on the total weight of the first concentrated reaction product. The concentration of the pentachlorodisilane in the first concentrated reaction product may vary from the ranges set forth herein. For example, distillation of the crude reaction product could involve additional trays or plates could be utilized in an effort to provide further purification in a single purification step.

The concentration of the pentachlorodisilane in the first concentrated reaction product may be determined via known methods, e.g. gas chromatography, optionally via a gas chromatography-thermal conductivity detector.

While each iterative purification step may be independently selected, in certain embodiments, each iterative purification step comprises distillation. Even in this embodiments, parameters associated with distillation (e.g. the elevated temperature and/or the reduced pressure) may be independently selected via each iterative distillation step. Typically, however, each iterative distillation step utilizes the parameters identified above relative to the elevated temperature and the reduced pressure.

In certain embodiments, the method comprises at least 1, alternatively at least 2, alternatively 3, iterative distillation steps subsequent to preparing the crude reaction product comprising the pentachlorodisilane to give the purified reaction product comprising the pentachlorodisilane. However, the method is not so limited, any number of iterative distillation steps, or iterative purification steps, may be utilized. The number of iterative distillation steps, or iterative purification steps, is typically contingent on a desired concentration of the pentachlorodisilane in the purified reaction product.

Any number of individual reaction products, crude reaction products, or concentrated reaction products may be combined to form a batch. In certain embodiments, a number of independently prepared crude reaction products are combined to form a batch of crude reaction product. The batch of crude reaction product is then purified according to the present method to give the pentachlorodisilane.

In certain embodiments, the purified reaction product comprises the pentachlorodisilane in an amount of at least 50, alternatively at least 55, alternatively at least 60, alternatively at least 65, alternatively at least 70, alternatively at least 75, alternatively at least 80, alternatively at least 81, alternatively at least 82, alternatively at least 83, alternatively at least 84, alternatively at least 85, alternatively at least 86, alternatively at least 87, alternatively at least 88, alternatively at least 89, alternatively at least 90, alternatively at least 91, alternatively at least 92, alternatively at least 93, alternatively at least 94, alternatively at least 95, alternatively at least 96, alternatively at least 97, alternatively at least 97.5, alternatively at least 98, wt. % based on the total weight of the purified reaction product. Dependent on a number of iterative purification steps, the concentration of the pentachlorodisilane in the purified reaction product may be 100, alternatively 99.9999999, alternatively 99.999999, alternatively 99.99999, alternatively 99.9999, alternatively 99.999, alternatively 99.99, alternatively 99.9, alternatively 99.0, wt. %.

In addition to the byproducts that may be present in the reaction product, crude reaction product, and/or purified reaction product, various trace metals may also be present in any of these reaction products, including the purified reaction product. Such trace metals may be attributable to the metal hydride compound utilized or other sources, e.g. trace metals from preparing the hexachlorodisilane (for example if made via the Direct Process). By way of example, in certain embodiments, the purified reaction product comprises aluminum in an amount of less than 50 parts per billion (ppb).

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

EXAMPLES

Example 1: Preparation of Pentachlorodisilane

Partial Reduction of Hexachlorodisilane:

Hexachlorodisilane (3.48 kg; 12.9 mol) is loaded into a 12 L jacketed reactor and then heated to and held at a temperature of 80° C. The contents of the reactor is then maintained at a temperature between 80-90° C. and agitated while a metal hydride compound (DIBAH; 1.48 kg; 10.4 mol) is added over a period of 2 hours to give a reaction mixture. The reaction mixture is agitated for 30 minutes in the reactor and then distilled through a 5-tray column under vacuum to give a reaction product comprising pentachlorodisilane (PODS) (~3.2 kg; 16% PCDS via GC-TCD integrations), which is then condensed through a cooled condenser (5° C.) and collected in a 3 L receiving flask. The reaction product is then fractionally distilled under vacuum (down to 10 Torr) at 80° C. pot temperature through a 20-tray column to give a crude reaction product comprising pentachlorodisilane (PCDS) (494 g; 46% PCDS via GC-TCD integrations).

Purification of the Crude Reaction Product Comprising Pentachlorodisilane:

The partial reduction of hexachlorodisilane and subsequent distillation is repeated 18 times, and the resulting crude reaction products are then combined together to give a combined crude reaction product comprising pentachlorodisilane (13.6 kg). The combined crude reaction product is then fractionally distilled three times under vacuum (down to 10 Torr) at 80° C. pot temperature to give a purified reaction product comprising pentachlorodisilane (PCDS) (2.8 kg; 98+% PCDS via GC-TCD). The purified reaction product is then analyzed via ICP-MS at 10 ppb detection limit for 23 metals to give a total trace metal content of 89 ppb, including 10 ppb of Al.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A method of preparing pentachlorodisilane, said method comprising:
  partially reducing hexachlorodisilane with a metal hydride compound to give a reaction product comprising pentachlorodisilane; and
  purifying the reaction product to give a purified reaction product comprising pentachlorodisilane, wherein purifying the reaction product comprises:
    distilling the reaction product to prepare a plurality of crude reaction products comprising pentachlorodisilane;
    combining the plurality of crude reaction products to give a combined crude reaction product; and
    fractionally purifying the combined crude reaction product to give the purified reaction product.

2. The method of claim 1, wherein the metal hydride compound comprises diisobutylaluminum hydride (DIBAH).

3. The method of claim 1, wherein the purified reaction product comprises pentachlorodisilane in an amount of at least 95 wt. % based on the total weight of the purified reaction product.

4. The method of claim 3, wherein the purified reaction product comprises pentachlorodisilane in an amount of at least 98 wt. % based on the total weight of the purified reaction product.

5. The method of claim 1, wherein distilling the reaction product is carried out at a reduced pressure and an elevated temperature.

6. The method of claim 5, wherein: (i) the reduced pressure is from greater than 0 to 50 Torr; (ii) the elevated temperature is from 70 to 90° C.; or (iii) both (i) and (ii).

7. The method of claim 1, wherein: (i) the hexachlorodisilane and metal hydride compound are utilized in a molar ratio of from 1:0.01 to 1:3; (ii) the method is carried out in the absence of any solvent; (iii) partially reducing the hexachlorodisilane is carried out at an elevated temperature; (iv) purifying the reaction product comprises a plurality of purification steps; or (v) any combination of (i) to (iv).

* * * * *